US008438596B2

(12) United States Patent  (10) Patent No.: US 8,438,596 B2
Barton et al.  (45) Date of Patent: May 7, 2013

(54) AUTOMATIC CONTACT INFORMATION TRANSMISSION SYSTEM

(75) Inventors: James M. Barton, Alviso, CA (US); Brian Lanier, San Jose, CA (US)

(73) Assignee: TiVo Inc., Alviso, CA (US)

( * ) Notice: Subject to any disclaimer, the term of this patent is extended or adjusted under 35 U.S.C. 154(b) by 414 days.

(21) Appl. No.: 12/420,789

(22) Filed: Apr. 8, 2009

(65) Prior Publication Data
US 2010/0263004 A1  Oct. 14, 2010

(51) Int. Cl.
H04N 7/10  (2006.01)
H04N 5/445  (2006.01)
H04N 7/173  (2011.01)

(52) U.S. Cl.
USPC ................ 725/40; 725/32; 725/109

(58) Field of Classification Search ......... 725/110, 725/112, 42, 32, 40, 109
See application file for complete search history.

(56) References Cited

U.S. PATENT DOCUMENTS

| 4,233,628 | A | 11/1980 | Ciciora |
| 4,306,250 | A | 12/1981 | Summers et al. |
| 5,121,476 | A | 6/1992 | Yee |
| 5,233,423 | A | 8/1993 | Jernigan et al. |
| 5,247,364 | A | 9/1993 | Banker et al. |
| 5,271,626 | A | 12/1993 | Llenas et al. |
| 5,371,551 | A | 12/1994 | Logan et al. |
| 5,400,401 | A | 3/1995 | Wasilewski et al. |
| 5,428,400 | A | 6/1995 | Landis et al. |
| 5,438,423 | A | 8/1995 | Lynch et al. |
| 5,481,296 | A | 1/1996 | Cragun et al. |
| 5,508,746 | A | 4/1996 | Lim |
| 5,537,151 | A | 7/1996 | Orr et al. |
| 5,563,714 | A | 10/1996 | Inoue et al. |

(Continued)

FOREIGN PATENT DOCUMENTS

| DE | 44 34 034 A1 | 3/1996 |
| EP | 0 810 789 A2 | 5/1997 |

(Continued)

OTHER PUBLICATIONS

International Searching Authority, "Notification of Transmittal of the International Search Report and the Written Opinion of the International Searching Authority, or the Declaration," Jun. 1, 2010, International Application No. PCT/US2010/029993, 7 pages.

(Continued)

*Primary Examiner* — James R Sheleheda
(74) *Attorney, Agent, or Firm* — Hickman Palermo Truong Becker Bingham Wong LLP; Kirk D. Wong; Zhichong Gu

(57) ABSTRACT

According to one aspect, a DVR sends a user's contact information over a network to an interested party. The DVR prompts the user to enter contact information. After the user has supplied the requested contact information to the DVR, the DVR stores the contact information on the DVR's hard disk drive. Upon determining that a television program or advertisement contains a special tag that is associated with an interested party, the DVR displays, to the user, a prompt that invites the DVR user to allow the DVR to send the user's contact information to the interested party. If the user gives permission for the DVR to send the contact information to the interested party, then the DVR sends the contact information to the interested party (e.g., over the Internet).

26 Claims, 4 Drawing Sheets

U.S. PATENT DOCUMENTS

| | | | |
|---|---|---|---|
| 5,585,858 A | 12/1996 | Harper et al. | |
| 5,596,581 A | 1/1997 | Saeijs et al. | |
| 5,600,364 A | 2/1997 | Hendricks et al. | |
| 5,614,940 A | 3/1997 | Cobbley | |
| 5,627,936 A | 5/1997 | Prasad et al. | |
| 5,648,824 A | 7/1997 | Dunn et al. | |
| 5,659,539 A | 8/1997 | Porter et al. | |
| 5,659,653 A | 8/1997 | Diehl et al. | |
| 5,708,845 A | 1/1998 | Wistendahl et al. | |
| 5,734,786 A | 3/1998 | Mankovitz | |
| 5,774,170 A | 6/1998 | Hite et al. | |
| 5,778,135 A | 7/1998 | Ottesen et al. | |
| 5,790,935 A | 8/1998 | Payton | |
| 5,805,763 A | 9/1998 | Lawler et al. | |
| 5,838,314 A | 11/1998 | Neel et al. | |
| 5,852,478 A | 12/1998 | Kwoh | |
| 5,867,205 A | 2/1999 | Harrison | |
| 5,878,141 A | 3/1999 | Daly | |
| 5,892,536 A | 4/1999 | Logan et al. | |
| 5,929,849 A | 7/1999 | Kikinis | |
| 5,930,493 A | 7/1999 | Ottesen et al. | |
| 5,974,218 A | 10/1999 | Nagasaka et al. | |
| 5,987,210 A | 11/1999 | Iggulden et al. | |
| 6,005,603 A | 12/1999 | Flavin | |
| 6,008,802 A | 12/1999 | Lki et al. | |
| 6,058,430 A * | 5/2000 | Kaplan | 709/245 |
| 6,061,056 A | 5/2000 | Menard | |
| 6,072,532 A | 6/2000 | Chieh et al. | |
| 6,072,982 A | 6/2000 | Haddad | |
| 6,094,677 A | 7/2000 | Capek et al. | |
| 6,097,441 A | 8/2000 | Allport | |
| 6,108,042 A | 8/2000 | Adams et al. | |
| 6,163,316 A | 12/2000 | Killian | |
| 6,177,931 B1 | 1/2001 | Alexander et al. | |
| 6,185,574 B1 | 2/2001 | Howard et al. | |
| 6,229,532 B1 | 5/2001 | Fujii | |
| 6,243,741 B1 | 6/2001 | Utsumi | |
| 6,266,094 B1 | 7/2001 | Taylor, Jr. | |
| 6,313,854 B1 | 11/2001 | Gibson | |
| 6,349,410 B1 * | 2/2002 | Lortz | 725/110 |
| 6,351,596 B1 | 2/2002 | Ostrover | |
| 6,400,407 B1 | 6/2002 | Zigmond et al. | |
| 6,404,977 B1 | 6/2002 | Iggulden | |
| 6,412,111 B1 | 6/2002 | Cato | |
| 6,473,903 B2 | 10/2002 | Balakrishnan et al. | |
| 6,496,981 B1 | 12/2002 | Wistendahl et al. | |
| 6,546,556 B1 | 4/2003 | Kataoka et al. | |
| 6,637,032 B1 | 10/2003 | Feinleib | |
| 6,698,020 B1 | 2/2004 | Zigmond et al. | |
| 6,788,882 B1 | 9/2004 | Greer et al. | |
| 6,832,388 B1 * | 12/2004 | Du Val | 725/110 |
| 6,909,837 B1 | 6/2005 | Unger | |
| 6,968,364 B1 | 11/2005 | Wong et al. | |
| 6,977,691 B1 | 12/2005 | Middleton et al. | |
| 7,028,327 B1 | 4/2006 | Dougherty et al. | |
| 7,055,166 B1 | 5/2006 | Logan et al. | |
| 7,103,908 B2 * | 9/2006 | Tomsen | 725/141 |
| 7,114,170 B2 | 9/2006 | Harris et al. | |
| 7,194,754 B2 * | 3/2007 | Tomsen et al. | 725/60 |
| 7,308,698 B1 * | 12/2007 | Heughebaert et al. | 725/37 |
| 7,313,802 B1 * | 12/2007 | Tomsen | 725/23 |
| 7,421,729 B2 | 9/2008 | Zenoni | |
| 7,752,642 B2 | 7/2010 | Lemmons | |
| 2001/0042246 A1 * | 11/2001 | Yuen et al. | 725/1 |
| 2001/0052135 A1 | 12/2001 | Balakrishnan et al. | |
| 2002/0013950 A1 * | 1/2002 | Tomsen | 725/109 |
| 2002/0016965 A1 * | 2/2002 | Tomsen | 725/42 |
| 2002/0054091 A1 * | 5/2002 | Tomsen et al. | 345/748 |
| 2002/0104086 A1 * | 8/2002 | Tomsen et al. | 725/42 |
| 2002/0120925 A1 | 8/2002 | Logan | |
| 2002/0144262 A1 | 10/2002 | Plotnick et al. | |
| 2002/0184047 A1 | 12/2002 | Plotnick et al. | |
| 2002/0191950 A1 | 12/2002 | Wang | |
| 2003/0014754 A1 * | 1/2003 | Chang | 725/60 |
| 2003/0088872 A1 | 5/2003 | Maissel et al. | |
| 2003/0118014 A1 | 6/2003 | Iyer et al. | |
| 2003/0122966 A1 | 7/2003 | Markman et al. | |
| 2004/0040042 A1 | 2/2004 | Feinleib | |
| 2004/0103429 A1 | 5/2004 | Carlucci et al. | |
| 2004/0117483 A1 | 6/2004 | Singer et al. | |
| 2004/0210824 A1 | 10/2004 | Shoff et al. | |
| 2004/0268384 A1 | 12/2004 | Stone | |
| 2005/0055640 A1 * | 3/2005 | Alten | 715/719 |
| 2005/0076359 A1 | 4/2005 | Pierson et al. | |
| 2005/0097622 A1 | 5/2005 | Zigmond et al. | |
| 2005/0144635 A1 | 6/2005 | Boortz | |
| 2005/0226601 A1 | 10/2005 | Cohen et al. | |
| 2005/0262539 A1 | 11/2005 | Barton et al. | |
| 2005/0273828 A1 | 12/2005 | Barton | |
| 2005/0278747 A1 | 12/2005 | Barton et al. | |
| 2006/0136980 A1 | 6/2006 | Fulcher et al. | |
| 2007/0079353 A1 | 4/2007 | Boortz | |
| 2007/0300249 A1 | 12/2007 | Smith et al. | |
| 2007/0300250 A1 | 12/2007 | Smith et al. | |
| 2008/0010130 A1 * | 1/2008 | Pyhalammi et al. | 705/14 |
| 2008/0163379 A1 | 7/2008 | Robinson et al. | |
| 2009/0297122 A1 | 12/2009 | Barton | |
| 2010/0080529 A1 | 4/2010 | Barton et al. | |
| 2011/0202963 A1 | 8/2011 | Fulcher et al. | |
| 2012/0027383 A1 | 2/2012 | Barton et al. | |

FOREIGN PATENT DOCUMENTS

| | | |
|---|---|---|
| EP | 0784400 | 7/1997 |
| EP | 0 827 340 A2 | 8/1997 |
| EP | 0817486 A2 | 1/1998 |
| EP | 0 849 946 A2 | 6/1998 |
| JP | 357191855 A | 11/1982 |
| JP | 3-106285 A | 5/1991 |
| JP | 1996-123821 | 5/1996 |
| JP | H8-205101 | 8/1996 |
| JP | H9-107539 | 4/1997 |
| JP | 08-022688 | 1/1998 |
| JP | 10-243361 | 9/1998 |
| JP | 1998-512420 | 11/1998 |
| JP | 1998-336590 | 12/1998 |
| JP | H11-239333 | 8/1999 |
| WO | WO 92/22983 | 12/1992 |
| WO | WO 96/08921 | 3/1996 |
| WO | WO 97/02700 | 1/1997 |
| WO | WO 97/31480 | 8/1997 |
| WO | WO 99/30493 | 12/1997 |
| WO | WO 98/03016 | 1/1998 |
| WO | WO 98-17064 | 4/1998 |
| WO | WO98/17064 | 4/1998 |
| WO | WO/98/18259 | 4/1998 |
| WO | WO98/48566 | 10/1998 |
| WO | WO/9914968 | 1/1999 |
| WO | WO 99/038321 | 7/1999 |
| WO | WO 00/10327 | 2/2000 |
| WO | WO 01/47279 | 6/2001 |
| WO | WO 01/53963 | 7/2001 |
| WO | WO 2005/034503 A3 | 4/2005 |

OTHER PUBLICATIONS

"Current claims from PCT application as filed," International Application No. PCT/US2010/029993, 5 pages.

European Office Action in Application No. 06785534.6 dated Aug. 5, 2011 (3 pages).

Current claims of European application No. 06785534.6 dated Aug. 2011 (3 pages).

International Preliminary Examining Authority, "Notification of Transmittal of International Preliminary Examination Report," Apr. 2, 2002, 13 pages.

Current Claims of International Application No. PCT/US00/34819, 4 pages.

Metabyte Announces Personalized TV Software; PR Newswire, Jan. 21, 1999.

State Intellectual Property Office of PRC "The first Office Action", mailed Mar. 13, 2009, serial No. 200480033609.3, Applicant: Tivo Inc., 8 pages.

Current claims for SIPO PRC application No. 200480033609.3, 10 pages.

EP application No. 00966775.9, "Summons to attend oral proceedings pursuant to Rule 115(1) EPC," Nov. 2, 2009, 4 pages.

Current claims of EP application No. 00966775.9, 7 pages.
European Patent Office, "Official Office Action" In Application No. 99 909 867.6-2202 dated Dec. 27, 2005, 5 pages.
Current Claims in European Patent Application No. 99 909 867.6-2202, 9 pages, dated Dec. 2005.
Europen Patent Office, "Office Action" in Application No. 00966775.9-2202, dated Apr. 20, 2007, 3 pages.
Current Claims in European Patent Application No. 00966775.9-2202, 14 pages, dated Apr. 2007.
European Office Action in Application No. 07021582.7, dated Oct. 14, 2010, 7 pages.
Current Claims of European Application No. 07021582.7, dated Oct. 2010, 4 pages.
European Patent Office, "Office Action" in Application No. 07021583.5, dated Feb. 7, 2008, 9 pages.
Current Claims of Foreign Application No. 07021583.5, 2 pages.
European Patent Office, "European Search Report", Foreign application No. PCT/US06/24688, dated Jul. 11, 2008, 11 pages.
Current Claims, for PCT/US06/24688, dated Jul. 2008, 13 pages.
European Patent Office, "Office Action", in Application No. 07021582.7, dated Feb. 15, 2008, 9 pages.
Current Claims of Foreign Application No. 07021582.7, dated Feb. 2008, 4 pages.
Japanese Patent Office, Official Notice for Preliminary Rejections (English translation), Japan Application No. 2001-547844, dated Apr. 16, 2010, 3 pages.
Current Claims for Japan Application No. 2001-547844, dated Apr. 2010, 14 pages.
The Patent Office of the State Intellectual Property Office of the People'S Republic of China, "Notice of 1st Office Action", in Foreign Application No. 2005/10009480.9, dated Dec. 21, 2007, 8 pages.
Current Claims for foreign Application No. 2005/10009480.9, 3 pages.
"Media4" press release, dated Apr. 1996, 1 page.
International Searching Authority, "Office Action" in application No. PCT/US04/32757, dated May 11, 2007, 13 pages.
Current Claims in Application No. PCT/US04/32757, dated May 2007, 10 pages.
European Patent Office, "Office Action" in Application No. 07 021583.5-1241, Applicant: Tivo Inc., Dated May 2, 2011, 4 pages.
Current Claims in Application No. 07 021 583.5-1241, Applicant: Tivo Inc., Dated May 2011, 2 pages.
U.S. Appl. No. 09/665,921, filed Sep. 20, 2000.
U.S. Appl. No. 11/182,135, filed Jul. 14, 2005.
U.S. Appl. No. 11/182,876, filed Jul. 14, 2005.
U.S. Appl. No. 11/182,135, filed Jul. 14, 2002, Advisory Office Action, mailed Jun. 25, 2010.
U.S. Appl. No. 11/473,990, filed Jun. 22, 2006, Office Action, mailed Jul. 20, 2010.
U.S. Appl. No. 09/665,921, filed Sep. 20, 2000, Office Action, mailed Nov. 25, 2008.
U.S. Appl. No. 11/182,135, filed Jul. 14, 2005, Office Action, mailed Mar. 9, 2010.
U.S. Appl. No. 11/182,135, filed Jul. 14, 2005, Notice of Allowance, mailed Mar. 16, 2011.
Chinese Office Action in Application No. 200580041645.9 dated Nov. 24, 2011 (9 pages).
Current Claims of Chinese Application No. 200580041645.9 dated Nov. 2011 (11 pages).
Chinese Office Action in Application No. 200680055082.3 dated Nov. 6, 2011 (6 pages).
Current Claims in Chinese Application No. 200680055082.3 dated Nov. 2011 (9 pages).
Japanese Action in Application No. 2009-516469 dated Nov. 22, 2011(5 pages).
Current Claims in Japanese Application No. 2009-516469 dated Nov. 2011 (22 pages).
European Patent Office, "Notice of Opposition", in application No. 0966775.9-2202/1214842, dated Aug. 19, 2011, 48 pages.
Current Claims in Application No. 0966775.9-2202/124842, dated Aug. 2011, 7 pages.
Japanese Office Action in International Application No. 2011-253349 dated Aug. 28, 2012 (11 pages).
Japanese Current Claims of International Application No. 2011-253349 dated Aug. 2012 (4 pages).
Canadian Office Action in Application No. 2,653,308 dated Feb. 20, 2012 (3 pages).
Current Claims of Canadian Application No. 2,653,308 dated Feb. 2012 (17 pages).
(A) Shinichi Makino et al., "Gazou Jyou-hou Kou-gaku to Hou-sou Gi-jyutsu (Academic Journal of Television): 5-3 Moji Hou-sou System wo Katsu-you Shita Interactive Television Hou-sou," Shadan-houjin Television Gakkai, Nov. 1995 (vol. 49, No. 11):1482-1487. Nov. 20, 1995. ISSN: 0386-6831, 3 pages (best available translation).
Japan Patent Office, Interrogation in application No. 2001-52965, dated Apr. 17, 2012.
Current claims in application No. 2001-52965, dated Nov. 8, 2011, 5 pages.
U.S. Appl. No. 12/572,023, filed Oct. 1, 2009, Office Action, mailed Sep. 12, 2012.
Office Action in European application No. 11182065.0 dated Dec. 16, 2011 (9 pages).
Current Claims of European application No. 11182065.0 dated Dec. 2011 (3 pages).
U.S. Appl. No. 12/420,789, filed Apr. 8, 2009, Office Action.

* cited by examiner

US 8,438,596 B2

AUTOMATIC CONTACT INFORMATION TRANSMISSION SYSTEM

FIELD OF THE INVENTION

Embodiments of the invention generally relate to digital video recorders (DVRs). Embodiments of the invention relate more specifically to techniques for automatically transmitting a DVR user's contact information to an interested party so that the interested party can contact the DVR user.

BACKGROUND

The approaches described in this section could be pursued, but are not necessarily approaches that have been previously conceived or pursued. Therefore, unless otherwise indicated herein, the approaches described in this section are not necessarily prior art to the claims in this application and are not admitted to be prior art by inclusion in this section.

As used herein, a "program" is any content, visual and/or audible, that is presented through a television's display and/or speakers. For example, a program might be an episode of a multi-episode series, a movie, a sporting event, or a news presentation, although this is not an exclusive list of "programs." When a digital video recorder ("DVR") schedules a program for future recording, the DVR attempts to add the program to a "to do" list that the DVR maintains within the DVR's own storage mechanisms. Whenever a program on the DVR's "to do" list is broadcasted, the DVR automatically records that program.

Often, a person will be watching a program or advertisement on his television, when he will see something about which he is interested in obtaining more information. The person might even see something that he would like to purchase. However, often, the person will not have any notion about how to obtain more information (or purchase) the thing that he saw on his television. The program or advertisement might only mention a product, but might give no indication about where or how to buy that product, for example.

Sometimes, a program or advertisement will display a phone number that the person can call in order to obtain more information or purchase a product. However, some people might be too lazy, or too involved in the program that they are watching, to move to the telephone (which might not be located near to the television) and dial the displayed telephone number. Some people find telephone numbers difficult to remember, and might forget what number they were supposed to dial by the time they have the opportunity to place a telephone call.

As a result, the person often ends up not obtaining the information or product in which he was interested, and the supplier of the information or product potentially loses the person's business, from which the supplier otherwise might have benefited.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
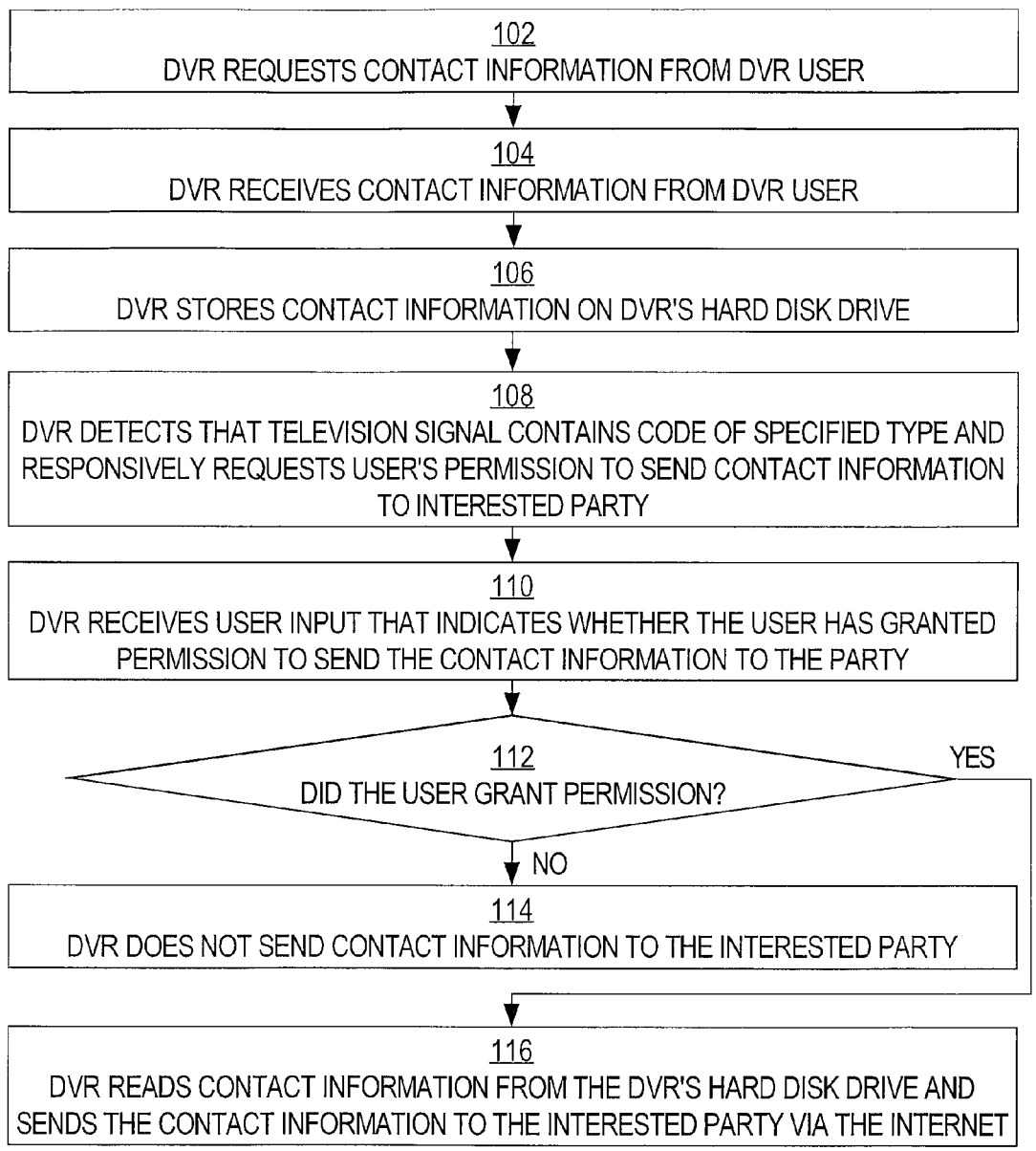
FIG. 1 is a flow diagram that illustrates an example of a technique for obtaining, storing, and supplying a DVR user's contact information to an interested party, according to an embodiment of the invention.

A method and apparatus for scheduling the recording of upcoming programs, and for extending the duration of the time interval during which those programs will be recorded, is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 DVR Overview
    3.0 Automatic Contact Information Transmission System
    4.0 Implementation Mechanisms-Hardware Overview
    5.0 Extensions and Alternatives
1.0 General Overview The needs identified in the foregoing Background, and other needs and objects that will become apparent for the following description, are achieved in the present invention, which comprises, in one aspect, a technique whereby a DVR sends a DVR user's contact information (e.g., name, telephone number, street address, e-mail address, etc.) over a network (e.g. the Internet) to a supplier of products, a supplier of services, and/or a supplier of information.

In one embodiment of the invention, the DVR prompts the DVR user (e.g., the DVR's owner) to enter contact information for the DVR user. The contact information may include, among other items of information, the DVR user's name, one or more of the DVR user's telephone numbers, the DVR user's home street address (i.e., the address at which the DVR user lives), the DVR user's shipping address (if different from the DVR user's home street address), and/or other information about the DVR user. In response to the DVR's prompt, the DVR user supplies the requested contact information to the DVR. For example, the user might supply the contact information to the DVR via buttons on a DVR remote control and an on-screen representation of selectable numbers, letters, and other characters which the contact information might comprise. After the DVR user has supplied the requested contact information to the DVR, the DVR stores the contact information on the DVR's hard disk drive or other persistent storage mechanism.

According to one embodiment of the invention, a broadcaster of television programs (e.g., via cable or via satellite signals) or some other party includes, encoded (e.g., in a closed-captioning stream) within a television program or advertisement, a "tag" or other code or signal that the DVR is capable of understanding. The tag is of a kind that indicates to the DVR that an interested party would like to receive the DVR user's contact information. Additional information on tags that may be contained in, or broadcasted in conjunction with, television programs or advertisements, is described in U.S. patent application Ser. No. 09/665,921, titled "CLOSED CAPTION TAGGING SYSTEM," and in U.S. patent application Ser. No. 11/473,543, titled "IN-BAND DATA RECOGNITION AND SYNCHRONIZATION SYSTEM." Both U.S. patent application Ser. No. 09/665,921 and U.S. patent application Ser. No. 11/473,543 are incorporated by reference for all purposes as though fully disclosed herein. In one embodiment of the invention, the tag is a specified, DVR-recognized code that is contained in the closed-captioning stream that accompanies the television program or commercial; the tag may be embedded in the vertical blanking interval (VBI) of an analog signal, or in a private data channel in an MPEG2 multiplex. Although in one embodiment of the invention, the tag is expressly inserted into the closed-captioning stream (in addition to other text that is already contained in that stream), in an alternative embodiment of the invention, the tag is derived by inputting portions of the usual contents of the closed-captioning stream into a hash function, which produces hash codes, at least some of which represent tags. In such an alternative embodiment of the invention, there is no need to insert tags into the closed-captioning stream; instead, the tags are derived from text that is already contained in that stream. In yet another embodiment of the invention, tags can be derived from information that is contained in the frames of the video content itself, and/or from the audio that accompanies the video content. Such video and/or audio data can similarly be passed through a hash function to derive hash codes, at least some of which can be mapped to tags with specified characteristics. In one embodiment of the invention, the tag also identifies a universal resource locator ("URL") and/or e-mail address of a supplier of information, services, and/or products (e.g., the information, services, or products that are featured in the television program or advertisement that contains the tag). In such an embodiment of the invention, upon determining that a television program or advertisement contains such a tag, the DVR displays, to the DVR user, an icon and/or verbal prompt that invites the DVR user to allow the DVR to send the DVR user's contact information to the supplier. For example, the DVR may display such an icon and/or prompt in an overlay in a portion of the television screen in a manner that does not interfere significantly with the television program or advertisement that is currently being displayed; in this manner, the DVR may display the icon and/or prompt without interrupting the DVR user's viewing experience. The DVR's display of the icon and/or prompt may be accompanied by the DVR audibly playing a tone that helps to alert the DVR user as to the current presence of the icon and/or prompt.

According to one embodiment of the invention, in response to the DVR's display of the icon and/or prompt described above, the DVR user is given the opportunity to either (a) permit the DVR to send the DVR user's contact information to the supplier or (b) refuse to permit the DVR to send the DVR user's contact information to the supplier. The DVR may receive input from the DVR user via the DVR remote control, for example. If the DVR user indicates, via the input, a refusal to allow the DVR user's contact information to be sent, then the DVR prevents the DVR user's contact information from being accessed by the supplier (by not sending the DVR user's contact information to the supplier).

Alternatively, if the DVR user indicates, via the input, permission for the DVR to send the DVR user's contact information to the supplier, then, in one embodiment of the invention, the DVR reads the DVR user's contact information from the DVR's hard disk drive or other persistent storage device and sends the DVR user's contact information to the URL and/or e-mail address that is indicated in or otherwise associated with the tag that is encoded in the television program or advertisement. In one embodiment of the invention, the DVR sends such information over the Internet, initially through an Ethernet port or wireless communication interface through which the DVR is communicatively coupled to the Internet.

In one embodiment of the invention, when the DVR sends the DVR user's contact information to the supplier's URL and/or e-mail address, a person or automated mechanism at the supplier's end receives the DVR user's contact information and takes some responsive action. For example, the person or mechanism may initiate a telephone call to one or more of the telephone numbers that are specified in the DVR user's contact information. During such a call, the person or mechanism might provide additional information to the DVR user about a product or service that was featured in the television program or advertisement. Additionally or alternatively, during such a call, the person or mechanism might invite the DVR user to purchase a product or service that was featured in the television program or advertisement. For another example, the person or mechanism might send, over the Internet, an e-mail message to one or more of the DVR user's e-mail addresses that are specified in the DVR user's contact information. For yet another example, the person or mechanism might send, over the Internet, to the DVR, one or more instructions which cause the DVR to display information to the DVR user on the television screen, and/or which cause the DVR to request additional information from the DVR user via a DVR-generated and displayed user interface and the DVR remote control.

As a result of the foregoing techniques, DVR users are able to obtain information about products and services that those DVR users see on television without being troubled with obtaining or remembering specific details about how to obtain that information. In one embodiment of the invention, inviting a supplier to contact the DVR user can be achieved simply through the DVR user's pressing of a button on the DVR remote control. Thus, the DVR user does not need to scramble to write down a telephone number or look up information about a product or service that he saw. The DVR user does not need to interrupt his television viewing experience to find a telephone and dial a number (which many DVR users might be loathe to do). The foregoing techniques potentially benefit suppliers and advertisers of information, products, and services, who otherwise might miss out on business opportunities that are made possible from the DVR's provision of DVR users' contact information to those suppliers and advertisers.

In other aspects, embodiments of the invention encompass a computer apparatus and a computer-readable storage medium configured to carry out the foregoing technique.

2.0 DVR Overview

Figure 2A:
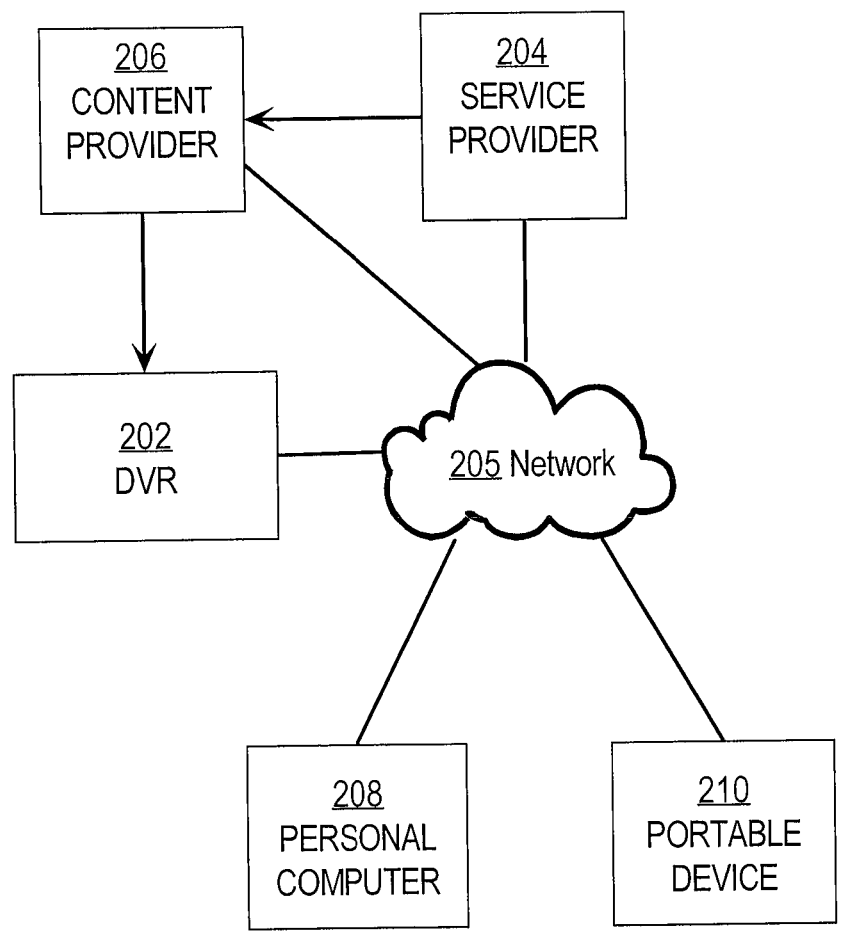
FIG. 2A illustrates an example system in which an embodiment of the invention may be implemented.

FIG. 2A illustrates an example system in which an embodiment of the invention may be implemented. The system contains at least one client device such as DVR 202 which is communicatively coupled to network 205 through any communication interface, such as an Ethernet interface or wireless communications port. The functionality of a DVR is typified in U.S. Pat. No. 6,233,389, which is owned by the Assignee and is hereby incorporated by reference. The system also includes service provider 204, content provider 206, personal computer 208 and portable device 210.

Personal computer 208 may be a personal computing device, such as a desktop computer or laptop computer, and is also coupled to network 205 through any communications interface, including wireless. Portable device 210 may be any handheld computing device, cellular phone, portable media player, or any other portable device capable of displaying multimedia content and may be coupled to network 205 through any communications interface, including wireless. DVR 202, personal computer 208, and portable device 210 each communicate with service provider 204 through network 205. In another embodiment, DVR 202, personal computer 208, and portable device 210 each communicate with content provider 210 through network 205.

Network 205 may be implemented by any medium or mechanism that provides for the exchange of data between devices in the communication system. Examples of network 205 include, without limitation, a network such as a Local Area Network (LAN), Wide Area Network (WAN), the Internet, one or more terrestrial, satellite or wireless links, etc. Alternatively or additionally, any number of devices connected to network 205 may also be directly connected to each other through a communications link.

In one embodiment, content provider 206 provides broadcast program content to DVR 202 via cable, satellite, terrestrial communication, or other transmission method. Broadcast program content may include any multimedia content such as: audio, image, or video content. In another embodiment, content provider 206 provides multimedia content, such as any downloadable content, through network 205 to DVR 202, personal computer 208, or portable device 210.

In one embodiment, DVR 202 communicates with service provider 204, which provides program guide data, graphical resources (such as fonts, pictures, etc.), service information, software, advertisements, event identification data, and other forms of data enable DVR 202 to operate independently of service provider 204 to satisfy user interests. In another embodiment, DVR 202, personal computer 208, and portable device 210 can communicate with each other to transfer content, metadata, or any other data through network 205, communication connection, or any local network.

In another embodiment, content provider 206 may provide, to service provider 204, content data or any metadata, including promotional data, icons, web data, and other information. Service provider 204 may then interpret the metadata and provide the content data metadata to DVR 202, personal computer 208, or portable device 210.

Figure 2B:
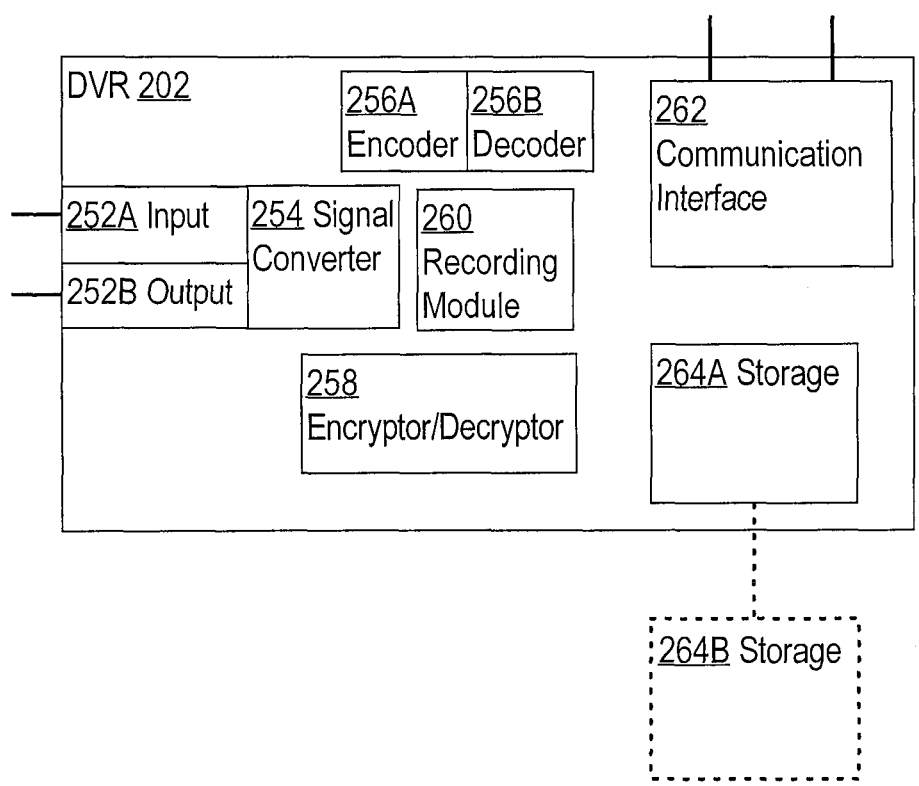
FIG. 2B is a block diagram illustrating a general overview of the components of a Digital Video Recorder (DVR), according to an embodiment of the invention.

Referring to FIG. 2B, in an embodiment, DVR 202 generally comprises a plurality of components, signified by Signal Converter 254, that are necessary to digitize an analog television signal and convert it into a digital data stream or accept a digital data stream. An example of the internal structure and operation of a DVR is further described in U.S. Pat. No. 6,233,389.

DVR 202 receives broadcast signals from an antenna, from a cable TV system, satellite receiver, etc., via input 252A. Input 252A may comprise a plurality of tuning modules that allow a plurality of signals to be received and recorded simultaneously. For example, a TV input stream received by input 252A may take the form of a National Television Standards Committee (NTSC) compliant signal or a PAL compliant broadcast signal. For another example, a TV input stream received by input 252A may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal.

An MPEG-2 transport multiplex supports multiple programs in the same broadcast channel with multiple video and audio feeds and private data. Input 252A tunes to a particular program in a channel, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input 252A and passed to the other modules as if the signals had been delivered via an MPEG-2 private data channel.

Recording Module 260 records the incoming data stream by storing the digital data stream on at least one storage facility, signified by Storage 264A/264B that is designed to retain segments of the digital data stream. Storage 264A/264B may be one or more non-volatile storage devices (e.g., hard disk, solid state drive, USB external hard drive, USB external memory stick, USB external solid state drive, network accessible storage device, etc.) that are internal 264A and/or external 264B. A Signal Converter 254 retrieves segments of the data stream, convert the data stream into an analog signal, and then modulate the signal onto a RF carrier, via Output 252B, through which the signal is delivered to a standard TV set. Output 252B may alternatively deliver a digital signal to a TV set or video monitor. For example, DVR 202 may utilize a Digital Visual Interface port (DVI) for sending digital signals to a TV via a DVI cable.

DVR 202 also includes a Communication Interface 262, through which the DVR 202 communicates with Network 205 via Ethernet, wireless network, modem, or other communications standard. Further, DVR 202 may be integrated into a TV system such that the components described above are housed in a TV set capable of performing the functions of each component of DVR 202.

In another embodiment, DVR 202 generally comprises a plurality of components necessary to receive, record, store, transfer and playback digital data signals from a plurality of sources, such as a PC, a DVR, a service provider, or content server. DVR 202 can transfer digital data signals to another DVR or PC. DVR 202 may encode or decode digital signals via Encoder 256A and Decoder 256B into a plurality of formats for playback, storage or transfer. According to one embodiment of the invention, encoder 256A produces MPEG streams. According to another embodiment of the invention, encoder 256A produces streams that are encoded using a different codec. Decoder 256B decodes the streams encoded by encoder 256A or streams that are stored in the format in which the streams were received using an appropriate decoder. DVR 202 can also encrypt or decrypt digital data signals using Encryptor/Decryptor 258 for storage, transfer or playback of the digital data signals.

In one embodiment, DVR 202 communicates with Service Provider 204, which provides program guide data, graphical resources such as brand icons and pictures, service information, software programs, advertisements, and other forms of data that enable DVR 202 to operate independently of the Service Provider 204 to perform autonomous recording functions. Communication between DVR 202 and Service Provider 204 utilizes a secure distribution architecture to transfer data between the DVR 202 and the Service Provider 204 such that both the service data and the user's privacy are protected.

3.0 Automatic Contact Information Transmission System

FIG. 1 is a flow diagram that illustrates an example of a technique for obtaining, storing, and supplying a DVR user's contact information to an interested party, according to an embodiment of the invention. In one embodiment of the invention, at least some of the steps of the illustrated technique are performed by the DVR shown in FIGS. 2A and 2B. Alternative techniques, according to various alternative embodiments of the invention, may comprise fewer, greater, or different steps than those illustrated in FIG. 1.

Referring now to FIG. 1, in block 102, a DVR requests contact information from a DVR user. For example, the DVR may request this information by sending a verbal request for the information to a television screen or monitor. In one embodiment of the invention, the DVR displays, on the television screen or monitor, a user interface that depicts user-selectable numbers and letters. By selecting these numbers and letters using navigation buttons on a DVR remote control, the DVR user provides his contact information to the DVR. The user interface may contain separate labeled fields into which the user can enter his name, one or more street addresses, one or more telephone numbers, one or more e-mail addresses, one or more instant messaging identities, one or more credit card numbers, etc. In one embodiment of the invention, the DVR user is permitted to leave certain fields blank.

The DVR may request the contact information initially the first time that the DVR is powered on. Additionally or alternatively, the DVR may request the contact information as part of a process whereby the DVR user subscribes to a DVR service agreement (DVR users are typically required to subscribe to some service so that their DVRs can obtain electronic programming guide information that the DVRs need in order to determine the dates, times, and channels on which programs are going to be broadcasted). In one embodiment of the invention, the DVR user can opt in or opt out of having the DVR use the user's personal information automatically whenever a contact information request is displayed. In one embodiment of the invention, the DVR does not request the contact information until the contact information is needed (e.g., later in the process described below), and then only if the contact information has not yet been stored on the DVR's hard disk drive or other persistent storage device.

In block 104, the DVR receives the DVR user's contact information from the DVR user. For example, the DVR may receive the DVR user's contact information through a DVR-generated and displayed user interface as described above. Alternatively, the DVR may automatically retrieve the DVR user's contact information from a DVR service provider. In one embodiment of the invention, multiple different user profiles are stored on the DVR, and different user contact information is received for and associated with each user profile; the current user can select which of the several user profiles is active at any particular time. In one embodiment of the invention, each user of the DVR has a different remote control, which may be programmed to send, to the DVR, a user identifier that is associated only with that remote control. Each user identifier may be associated with a different user profile and different user contact information. In such an embodiment of the invention, the DVR stores the received user contact information with the user profile whose user identifier is sent from the programmed remote control that is currently being used to enter the user contact information.

In block 106, in response to receiving the DVR user's contact information, the DVR persistently stores the DVR user's contact information on the DVR's hard disk drive or other persistent storage device.

In block 108, the DVR detects that a television signal (or other signal, such as a signal that the DVR is receiving over the Internet, or a signal that is contained in DVR-recorded content that the DVR is playing, or a signal that the DVR is receiving from a cable or a satellite dish) that the DVR is receiving contains (or can have derived from it) a code or tag that is of a certain specified type. In response to detecting this code or tag in the signal, the DVR displays a verbal or textual prompt or icon on the television screen. The contents of the prompt may be based on a value that is specified in the tag; thus, the DVR may determine which prompt of several stored prompts is associated with the detected tag, and then fetch the associated prompt from a storage device for display. The verbal or textual prompt or icon informs the DVR user that there is some supplier or other interested party who would like to receive the DVR user's contact information. Typically, this supplier or interested party will be a person, organization, or other entity that is somehow associated with information, products, or services that are represented within a television program or advertisement that the signal represents or with which the signal is associated. As is mentioned above, in one embodiment of the invention, the DVR causes the television to emit an audible sound that indicates, to the DVR user, that the icon or prompt is currently being displayed on the television screen (so that the DVR user is more likely to notice the icon or prompt). In one embodiment of the invention, the prompt is in the form of a question that identifies the requesting supplier or interested party and asks the DVR user whether the DVR has the DVR user's permission to send the DVR user's contact information to the supplier or interested party. The DVR may present the icon and/or prompt in a manner (e.g., in an overlay that is semi-transparent and occupies only a portion of the television screen) that does not significantly intrude upon or interrupt the DVR user's television viewing experience.

In block 110, the DVR receives, from the DVR user, user input that indicates whether the DVR user has granted the DVR permission to send the DVR user's contact information to the supplier or interested party. In one embodiment of the invention, the DVR user supplies this user input by using the buttons on the DVR remote control to select a "YES" button or "NO" button that is displayed in the DVR-generated and displayed user interface. In one embodiment of the invention, the DVR user supplies this user input by pushing either a "YES" button on the DVR remote control or a "NO" button on the DVR remote control. In one embodiment of the invention, if a specified amount of time passes after the time that the DVR causes the icon or prompt to be displayed, and if the DVR has not yet received the user input from the DVR user, then the DVR treats the lack of user input as though the DVR user had selected "NO," or some other refusal to grant the DVR permission to send the DVR user's contact information. In one embodiment of the invention, the DVR tracks the number of times that a "YES" is selected, and the number of times that a "NO" is selected. In such an embodiment of the invention, the DVR sends this tracking information to the DVR service provider so that the DVR service provider can inform interested advertisers how many users selected "YES," and how many users selected "NO." An example of a real-time DVR usage reporting system is described in U.S. patent application Ser. No. 12/190,519, which is titled "REAL-TIME DVR USAGE AND REPORTING SYSTEM," and which is incorporated by reference for all purposes as though fully disclosed herein.

In block 112, the DVR determines whether the user input indicates that the DVR user has given the DVR permission to send the DVR user's contact information to the supplier or interested party. If the DVR determines that the user input indicates that the DVR user has agreed to allow the DVR to send the contact information, then control passes to block 116. Otherwise, control passes to block 114.

In block 114, in response to the DVR user's denial of permission (or refusal to grant permission) for the DVR to send the contact information, the DVR prevents the DVR user's contact information from being accessed by the supplier or interested party. In one embodiment of the invention, the DVR accomplishes this prevention by refraining from sending the DVR user's contact information to the supplier or interested party. The DVR may remove the icon or prompt from the television screen or monitor and regular program viewing may continue in the same manner as before the icon or prompt was displayed. Control eventually passes back to block 108 when the DVR next detects another tag or code of the specified kind in the television signal (or other signal, such as a signal that the DVR is receiving over the Internet, or a signal that is contained in DVR-recorded content that the DVR is playing, or a signal that the DVR is receiving from a cable or a satellite dish).

Alternatively, in block 116, in response to the DVR user's grant of permission for the DVR to send the contact information, the DVR reads the DVR user's previously stored contact information from the DVR's one or more storage devices, such as a hard disk drive or other persistent device (if that contact information has been stored by this time) and sends the DVR user's contact information over the Internet to a supplier, the service, or interested party that is associated with the tag or code mentioned above. In one embodiment of the invention, the tag or code contains or otherwise specifies a URL, e-mail address, or instant messaging identity of the supplier or interested party. Under such circumstances, the DVR sends the DVR user's contact information (or at least a specified portion thereof) to the URL, e-mail address, or instant messaging identity that is contained in or otherwise specified by the tag or code. In one embodiment of the invention, the DVR sends the DVR user's contact information over the Internet or some other network (e.g., a LAN, a WAN, etc.). In an embodiment in which different programmed remote controls correspond to different user profiles established on the same DVR, the DVR determines which user identifier was received from the programmed remote control from which the user's grant of permission was received, and sends the contact information that is associated with that user identifier.

In one embodiment of the invention, if the DVR determines that the DVR user's contact information has not yet been stored on the DVR's hard disk drive or other persistent storage device by this time, then the DVR requests the DVR user's contact information from the DVR user at this time (e.g., using the techniques described above with reference to blocks 102-104), and stores that contact information on the DVR's hard disk drive or other persistent storage device for current and later use. Thus, in one embodiment of the invention, the first time that the DVR requests and/or receives the DVR user's contact information is the first time that the DVR user agrees to allow the DVR to send the DVR user's contact information to some supplier or interested party. After the DVR has initially stored the DVR user's contact information, the DVR does not need to request the DVR user's contact information from the DVR user again.

In one embodiment of the invention, the supplier or interested party receives the DVR user's contact information over the Internet. In response to receiving this contact information, a person or mechanism at the supplier or interested party's end may initiate contact with the DVR user using the data that is contained within the contact information. For example, the person or mechanism may initiate a telephone call with the DVR user by entering (or, as it used to be called, "dialing") the person's telephone number (as indicated in the contact information) into the person or mechanism's telephone. For another example, the person or mechanism may send an e-mail message to an e-mail address that is indicated in the contact information. For another example, the person or mechanism may initiate an instant messaging session (e.g., using Yahoo! Instant Messenger) with the instant messaging identity that is indicated in the contact information. An instant messaging application may execute on the DVR itself, thus allowing instant communication with the DVR user, or on a computer that is also owned and/or used by the DVR user. For another example, the person or mechanism may send a letter, DVD, CD, sample, coupon, catalog, and/or other printed or encoded information to a street address that is indicated in the contact information. In one embodiment of the invention, the person or mechanism initiates a voice-over-IP ("VOIP") session with the DVR user's DVR using data (e.g., an Internet Protocol (IP) address) that is contained in the contact information that the DVR sent over the Internet. The person or mechanism may then communicate with the DVR user over this VOIP session.

Regardless of the communication approach that the person or mechanism uses to initiate communication with the DVR user, the person or mechanism may send a variety of communications to the DVR user. For example, the person or mechanism may send additional information about a product or service that was featured in the television program or advertisement that the DVR user was watching at the time that the DVR asked the DVR user's permission to send the contact information. For another example, the person or mechanism may invite the DVR user to purchase such a service or product. In one embodiment of the invention, the person or mechanism uses credit card or bank information that is contained in the contact information (though, in alternative embodiments of the invention, the contact information may omit such credit card or bank information) to charge the DVR user for a service or product that the DVR user purchases in the communication with the person or mechanism.

4.0 Implementation Mechanisms-Hardware Overview

Figure 3:
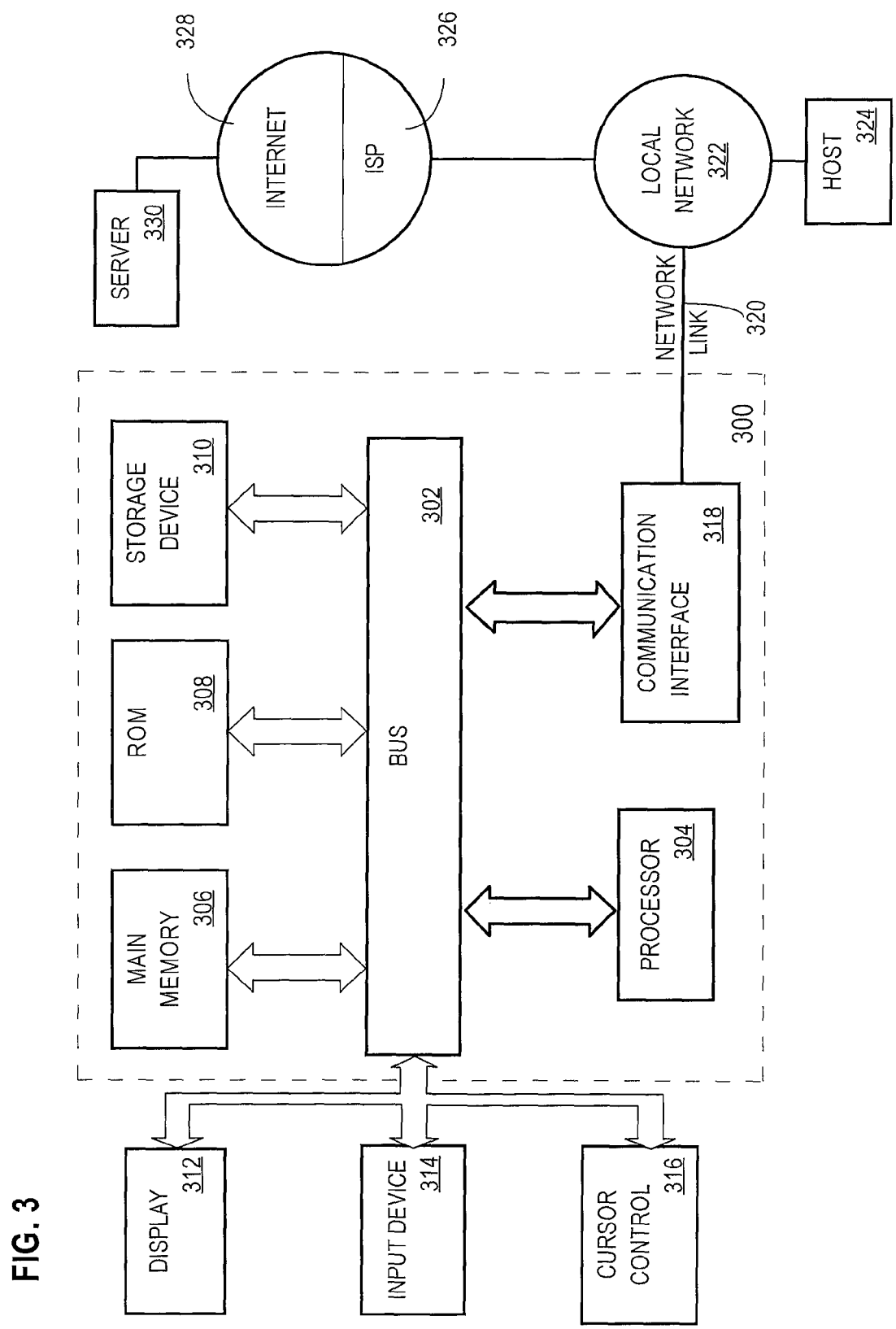
FIG. 3 is a block diagram that illustrates a digital video recorder upon which an embodiment may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory ("RAM") or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory ("ROM") 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube ("CRT"), for displaying information to a computer user. An input device 314, including alphanumeric and other keys, is coupled to bus 302 for communicating information and command selections to processor 304. Another type of user input device is cursor control 316, such as a mouse, trackball, stylus, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for selecting a frame of a multi-frame video program for display in accordance with a selected trick play mode of a DVR. According to one embodiment of the invention, selecting a frame of a multi-frame video program for display in accordance with a selected trick play mode of a DVR is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, or any other memory chip or cartridge.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network ("ISDN") card or a modem to provide a data communication connection to a corresponding type of telephone line. As another example, communication interface 318 may be a local area network ("LAN") card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider ("ISP") 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, in one embodiment of the invention, after the DVR has supplied the DVR user's contact information to the interested party (e.g., a supplier), as described above, the interested party uses the interested party's computer to initiate a voice-over-IP ("VOIP") session with the DVR. After such a session has been initiated, the interested party can speak directly to the DVR user via the DVR user's DVR and television set, through VOIP packets transmitted over the Internet. In such an embodiment of the invention, the contact information that the DVR transmits to the interested party includes the DVR's IP address and/or other identifiers that are unique to the DVR, so that the interested party's computer is able to establish the VOIP connection with the DVR over the Internet.

In one such embodiment of the invention, a microphone is connected or built into the DVR, so that the DVR is capable of receiving speech from the DVR user. In such an embodiment of the invention, the DVR transmits, over the VOIP connection, to the interested party's computer, audible speech that the DVR user emits. Thus, in one embodiment of the invention, the DVR user and the interested party have a voice communication with each other without using the DVR user's telephone—the DVR itself performs the voice communications role that the telephone otherwise would.

In a similar embodiment of the invention, the interested party establishes an over-the-Internet video conference between the interested party's computer and the DVR. The interested party and the DVR user communicate with each other in this video conference. The DVR may optionally be connected to or have a built-in video camera and microphone so that the interested party can both see and hear what the DVR user is doing and saying. In such an embodiment of the invention, the interested party's actions and speech can be presented to the DVR user through the screen and speakers of the television to which the DVR is attached.

In a similar embodiment of the invention, the interested party establishes an instant messaging connection between the interested party's computer and the DVR. The interested party and the DVR user communicate with each other in this video conference.

Although embodiments of the invention have been described above with reference to a DVR, alternative embodiments of the invention may be implemented in, and used relative to, devices other than a DVR. For example, in one embodiment of the invention, a portable memory device is used in placed of the DVR discussed above. An example of such a portable memory device, and such a device's other possible applications for transporting content, is described in U.S. patent application Ser. No. 12/191,261, which is titled "CONTENT DISTRIBUTION SYSTEM USING TRANSPORTABLE MEMORY DEVICES," and which is incorporated by reference for all purposes as though fully disclosed herein. At least some implementations of such a portable memory device do not require the ability to record television programs (e.g., some such devices might retrieve content from the Internet only).

What is claimed is:

1. A method for transmitting contact information, the method comprising:
 a multimedia device receiving a user's contact information and storing the contact information;
 the multimedia device receiving particular content comprising at least one of (a) a television program or advertisement that the multimedia device is receiving, (b) recorded content, or (c) content that the multimedia device is receiving over the Internet;
 the multimedia device receiving, a tag of a particular type, along with the received particular content, that indicates to the multimedia device that an interested party wants to receive the user's contact information;
 in response to the multimedia device receiving the tag of the particular type, performing:
  the multimedia device determining a particular interactive icon specified by the tag of the particular type, the particular interactive icon being among a plurality of icons that are stored on the multimedia device, the tag of the particular type comprising a first field identifying the interested party and a second field identifying the particular icon, the first field comprising at least one of a Universal Resource Locator (URL) or an email address of the interested party;
  in response to the multimedia device determining the particular interactive icon specified by the tag of the particular type, performing:
   the multimedia device overlaying the particular interactive icon with at least a portion of the received particular content;
   the multimedia device presenting the received particular content overlaid with the particular interactive icon to request the user's permission to send the user's contact information to the interested party that is associated with the tag; and
  in response to the multimedia device receiving the user's permission to send the user's contact information to the interested party, the multimedia device sending the user's contact information to the interested party over a network.

2. The method of claim 1, wherein the user's contact information comprises the user's name and at least one of: (a) the user's street address, (b) the user's telephone number, (c) the user's e-mail address, and (d) the user's instant messaging identifier.

3. The method of claim 1, wherein the multimedia device sends the user's contact information to the interested party over the network by sending the user's contact information to the interested party over the Internet.

4. The method of claim 1, wherein the multimedia device receives the user's contact information from the user through the user's manipulation of a remote control to navigate a user interface generated by the multimedia device.

5. The method of claim 1, wherein the tag is embedded in the television program or advertisement prior to a time that the multimedia device receives the television program or advertisement, and wherein the tag identifies at least one of: (a) a uniform resource locator (URL) that is associated with the interested party, (b) an e-mail address of the interested party, and (c) an instant messaging identifier of the interested party.

6. The method of claim 5, wherein the multimedia device sends the user's contact information to the interested party by sending the user's contact information to at least one of: (a) the URL, (b) the e-mail address of the interested party, and (c) the instant messaging identifier of the interested party.

7. The method of claim 1, wherein, during the DVR's display of the television program or advertisement, the particular icon signifies, to the user, that a party associated with the television program or advertisement is interested in obtaining the user's contact information.

8. The method of claim 1, wherein the multimedia device stores the user's contact information by storing the user's contact information on one or more storage devices within the multimedia device.

9. The method of claim 1, further comprising:
 in response to the multimedia device receiving the tag of the particular type, the multimedia device requesting the user's contact information from the user during a presentation of the recorded content, Internet-received content, television program, or advertisement.

10. The method of claim 1, wherein the multimedia device requests the user's permission to send the user's contact information to the interested party by displaying an overlay over a presentation of the recorded content, Internet-received content, television program, or advertisement; and wherein the overlay identifies the interested party.

11. The method of claim 1, wherein the contact information includes data that identifies the multimedia device, and wherein after sending the user's contact information to the interested party, the multimedia device facilitates live communication between the user and the interested party.

12. The method of claim 11, wherein the multimedia device facilitates live communication between the user and the interested party using voice-over-IP (VOIP) protocol.

13. The method of claim 11, wherein the multimedia device facilitates live communications between the user and the interested party using instant messaging.

14. A device configured to:
 receive a user's contact information and storing the contact information;
 receive particular content comprising at least one of (a) a television program or advertisement that the device is receiving, (b) recorded content, or (c) content that the device is receiving over the Internet;

receive a tag of a particular type, along with the received particular content, that indicates to the device that an interested party wants to receive the user's contact information;

in response to the device receiving the tag of the particular type, perform:

the device determining a particular interactive icon specified by the tag of the particular type, the particular interactive icon being among a plurality of icons that are stored on the device, the tag of the particular type comprising a first field identifying the interested party and a second field identifying the particular icon, the first field comprising at least one of a Universal Resource Locator (URL) or an email address of the interested party;

in response to the device determining the particular interactive icon specified by the tag of the particular type, performing:

the device overlaying the particular interactive icon with at least a portion of the received particular content;

the device presenting the received particular content overlaid with the particular interactive icon to request the user's permission to send the user's contact information to the interested party that is associated with the tag; and in response to the device receiving the user's permission to send the user's contact information to the interested party, the device sending the user's contact information to the interested party over a network.

15. The device of claim 14, wherein the user's contact information comprises the user's name and at least one of: (a) the user's street address, (b) the user's telephone number, (c) the user's e-mail address, and (d) the user's instant messaging identifier.

16. The device of claim 14, wherein the device sends the user's contact information to the interested party over the network by sending the user's contact information to the interested party over the Internet.

17. The device of claim 14, wherein the device receives the user's contact information from the user through the user's manipulation of a remote control to navigate a user interface generated by the device.

18. The device of claim 14, wherein the tag is embedded in the television program or advertisement prior to a time that the device receives the television program or advertisement, and wherein the tag identifies at least one of: (a) a uniform resource locator (URL) that is associated with the interested party, (b) an e-mail address of the interested party, and (c) an instant messaging identifier of the interested party.

19. The device of claim 14, wherein the device sends the user's contact information to the interested party by sending the user's contact information to at least one of: (a) the URL, (b) the e-mail address of the interested party, and (c) the instant messaging identifier of the interested party.

20. The device of claim 14, further comprising:
in response to the device receiving the tag of the particular type, the device displaying, via a display that is connected to the device, and during the device's display of the television program or advertisement, an icon that signifies, to the user, that a party associated with the television program or advertisement is interested in obtaining the user's contact information.

21. The device of claim 14, wherein the device stores the user's contact information by storing the user's contact information on one or more storage devices within the device.

22. The device of claim 14, further comprising:
in response to the device receiving the tag of the particular type, the device requesting the user's contact information from the user during a presentation of the recorded content, Internet-received content, television program, or advertisement.

23. The device of claim 14, wherein the device requests the user's permission to send the user's contact information to the interested party by displaying an overlay over a presentation of the recorded content, Internet-received content, television program, or advertisement; and wherein the overlay identifies the interested party.

24. The device of claim 14, wherein the contact information includes data that identifies the device, and wherein after sending the user's contact information to the interested party, the device facilitates live communication between the user and the interested party.

25. The device of claim 24, wherein the device facilitates live communication between the user and the interested party using voice-over-IP (VOIP) protocol.

26. The device of claim 24, wherein the device facilitates live communications between the user and the interested party using instant messaging.

* * * * *